US012098590B2

(12) United States Patent
Glover

(10) Patent No.: US 12,098,590 B2
(45) Date of Patent: Sep. 24, 2024

(54) BULLET-RESISTANT ENTRANCEWAY CURTAIN SECURITY DEVICE

(71) Applicant: Joshua Glover, Springfield, VA (US)

(72) Inventor: Joshua Glover, Springfield, VA (US)

( * ) Notice: Subject to any disclaimer, the term of this patent is extended or adjusted under 35 U.S.C. 154(b) by 217 days.

(21) Appl. No.: 17/839,023

(22) Filed: Jun. 13, 2022

(65) Prior Publication Data

US 2022/0396991 A1 Dec. 15, 2022

Related U.S. Application Data

(60) Provisional application No. 63/210,108, filed on Jun. 14, 2021.

(51) Int. Cl.

*E06B 5/10* (2006.01)
*E06B 9/06* (2006.01)
*F41H 5/24* (2006.01)

(52) U.S. Cl.

CPC .............. *E06B 5/10* (2013.01); *E06B 9/0692* (2013.01); *F41H 5/24* (2013.01)

(58) Field of Classification Search

CPC ............. E06B 5/10; E06B 9/0692; F41H 5/24
See application file for complete search history.

(56) References Cited

U.S. PATENT DOCUMENTS 8,857,310 B2 10/2014 Raiser
9,134,097 B1 9/2015 De Gaglia
9,702,665 B1 7/2017 Rose, Jr. et al.
9,746,289 B2 8/2017 Hahn et al.
9,949,556 B2 4/2018 Raske
10,151,566 B2 12/2018 Adrain
10,209,036 B1 * 2/2019 Rose, Jr. ................. F41H 5/013
10,928,166 B2 2/2021 Brennan et al.
10,942,011 B1 3/2021 Zea
11,187,030 B2 * 11/2021 Wong .................. E06B 9/17046
2017/0191306 A1 * 7/2017 Falesch ...................... E06B 5/10
2020/0232767 A1 7/2020 Riden
2020/0355024 A1 11/2020 Katcher et al.
2021/0348888 A1 * 11/2021 Zea ........................... E06B 9/86
2022/0396991 A1 * 12/2022 Glover .................. E06B 9/0692

* cited by examiner

*Primary Examiner* — Andrew J Triggs
(74) *Attorney, Agent, or Firm* — THE MARBURY LAW GROUP, PLLC

(57) ABSTRACT

Various embodiments include bullet-resistant multilayered curtain that can be quickly deployed to secure an entranceway from attackers and deter them from entering. A bullet-resistant multilayered curtain may be contained above an entranceway in a casing and supported by a quick release pin when in the stored configuration. The bullet-resistant curtain includes multiple horizontal bars that are distributed along the length of the bullet-resistant curtain. Firmly fixed on the perimeter of the entranceway are horizontal bar retainer clamps for locking the horizontal bars into place when the bullet-resistant curtain is in its deployed state. A vibration sensor control switch may be fixed on the perimeter of the entranceway and configured to activate vibration sensors fixed on the bullet-resistant curtain to detect vibrations and send notifications to remote authorities.

19 Claims, 16 Drawing Sheets

BULLET-RESISTANT ENTRANCEWAY CURTAIN SECURITY DEVICE

RELATED APPLICATION

This application claims the benefit of priority to U.S. Provisional Application No. 63/210,108 entitled "Bullet-Resistant Entranceway Curtain Security Device" filed on Jun. 14, 2021, the entire contents of which are incorporated herein by reference in its entirety.

TECHNICAL FIELD

This application relates to a security door device. More specifically, this application relates to a bullet-resistant security device for deterring attackers from entering or penetrating an entranceway.

BACKGROUND

Currently in the United States there have been over 400 mass shootings; shootings in America seem more prominent today than ever. Various entranceway security devices have been developed to mitigate this threat. Although standard bullet-resistant door devices contain polycarbonate and/or bullet resistant fiberglass which protect vital organs of an individual, these bullet-resistant door devices typically are expensive to make, install and maintain. Additionally, standard bullet-resistant door devices have an unwelcoming aesthetic.

SUMMARY

Various embodiments include a protection device for safely securing an entranceway from attackers and to deter them from entering. Various embodiments can be used to secure doors and windows as well, and is portable and easy to install. Various embodiments may include a bullet-resistant curtain made of panels of multiple layers of bullet resistant material, such as Kevlar, sewn together so that the panels uniformly straighten to a height of an entranceway. The panels of multiple layers of bullet resistant material may be attached to multiple horizontal bars with a length greater than the width of the entranceway that are distributed among the length of the curtain. Bar retainer clamps may be firmly fixed on the perimeter of the entranceway, with the bar retainer clamps configured to lock the horizontal bars into place when the protection device is deployed. In an undeployed state the bullet-resistant curtain may be contained in a casing that can be mounted above the entranceway. Additionally, a quick release pin may be included and configured to support the bullet-resistant curtain in the casing, with the pin positioned in a hole located on the lower front or side of the casing.

In some embodiments, the protection device may include vibration sensors on the bullet-resistant multilayered curtain configured to detect vibrations or impacts from penetrative objects, such as bullets from an attacker's weapon. A vibration sensor control switch, such as on the perimeter of the entranceway, may be configured to control the vibration sensors on the bullet-resistant multilayered curtain. The vibration sensors may be configured to send notifications of impacts on the bullet-resistant multilayered curtain via a wired or wireless device to an authority, such security personnel and/or law enforcement, to provide information that could be useful in pinpointing an attacker's location.

In the event of an emergency an operator may manually pull the quick release pin out of the mounting casing, thereby releasing the bullet-resistant curtain to slide out of the casing and down to the bottom of the entranceway. Once the bullet-resistant curtain is straightened, the operator may lock the ends of each of the horizontal bars into respective horizontal bar retainer clamps by rotating each bar retainer clamp cover until a security stud on the bar retainer clamp is locked into place. Lastly, the operator may manually press the vibration sensor control switch to power on the vibration sensors on the bullet-resistant curtain.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
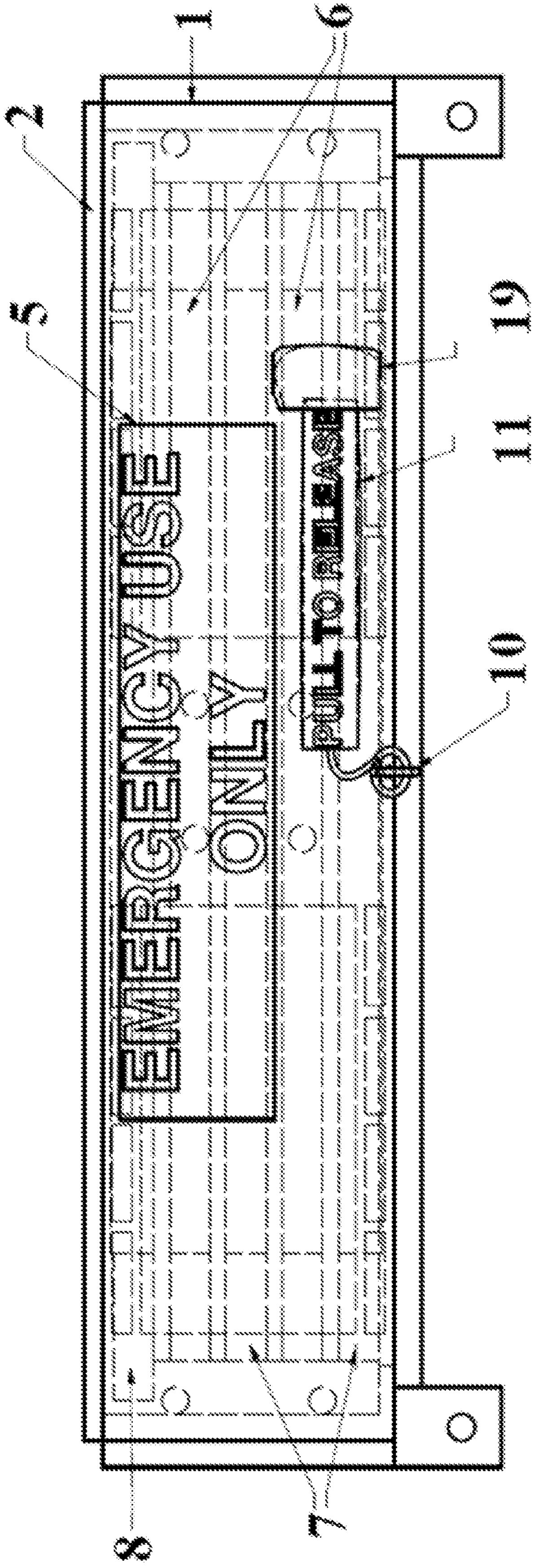
FIG. 1 is a front view of a bullet-resistant curtain security device in the stored configuration in accordance with some embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include an entranceway closure and protection device that can be quickly deployed to provide a bullet-proof barrier to entry through a doorway, window or other path for entering a room to protect occupants from attackers. Various embodiments include a bullet-resistant curtain made of panels of multiple layers of bullet resistant material selected and configured to stop projectiles from entering a room, with horizontal reinforcing bars interspersed along the length of the curtain and made of a material (e.g., titanium, steel, steel alloy, iron, etc.) strong enough to prevent entry by an individual when the bars are latched to bar retainer clamps mounted on the periphery of the entranceway. The horizontal bars may be long enough to extend beyond the width of the window or doorway and be engaged by the bar retainer clamps mounted on the periphery. Such bar retainer clamps may include a hinged cover (e.g., a semi-cylindrical cover), with each bar retainer clamp configured to lock one end of a horizontal bar when the hinged cover is rotated into place. The bullet-resistant curtain and horizontal bars may be stored in a casing configured to be mounted on the top of the doorway, window or other opening to a room and sized to receive the curtain and bars in a folded configuration.

Various embodiments provide a deployable bullet-resistant and sturdy barrier to entry into a room that can be deployed over any form of entranceway, such as a doorway, a window, an archway, or a doorless entrance. For ease of reference, the various forms of actual and potential accesses to a room or building that may be protected by various embodiments are referred to generally in the following descriptions and the claims as an "entranceway," which is intended to encompass any form of opening (e.g., doors, archways, windows, etc.) into a room or building, as well as structures in a wall (e.g., glass, plexiglass, screen, louvers, and the like) that are vulnerable to being broken into or penetrated, and that can be covered by a deployable curtain as described herein.

In the stored configuration, the bullet-resistant curtain and horizontal bars may be retained in the casing by one or more quick release retainer pins. The one or more quick release retainer pins may be coupled to a ribbon or lanyard that can be pulled to remove the pin or pins from the casing, thereby enabling the curtain to extend through an opening in the bottom side of the casing and unfold until the entire entranceway is covered. A person deploying the bullet-resistant curtain can then quickly couple the horizontal bars to the bar retainer clamps mounted on the periphery by slipping the ends of the bars into respective bar retainer clamps and rotating the bar retainer clamp covers over the bars to lock the bars in place. Once the clamp covers have been engaged on or around the horizontal bars, the bar retainer clamps prevent further movement of the bullet-resistant curtain in any direction, thereby securing the entranceway until released from the inside by disengaging all of the bar retainer clamps. Between the strong bars locked in the bar retainer claims mounted on the perimeter of the entranceway and the multiple layers of bullet-resistant material, the entranceway will remain sealed against ballistic weapons and physical entry by an intruder.

The bullet resistant material used in the curtain may include multiple layers of bullet resistant materials, such as Kevlar, which may be sewn together so that the panels uniformly straighten to a height of an entranceway when deployed. The panels of multiple layers of bullet resistant material may be attached to the horizontal bars by various methods, including within pockets sewn into an interior side of the curtain, in pockets positioned between layers of bullet-resistant material, or sandwiched between coplanar bullet-resistant material layers. The horizontal bars may be positioned at locations along the length of the bullet-resistant curtain so that when deployed, the horizontal bars will prevent entry or displacement of the bullet-resistant curtain, including at the weakest points of the entranceway.

In some embodiments, the protection device may include sensors (referred to herein as vibration sensors) positioned on the bullet-resistant multilayered curtain and configured to detect vibrations of someone trying to push through the curtain and impacts from penetrative objects, such as bullets or an attacker's weapon. The vibration sensors may be activated or deactivated by a control switch, which may be mounted on the perimeter of the entranceway. The vibration sensors may be configured to send notifications of impacts or large vibrations on the bullet-resistant curtain to an authority, such security personnel and/or law enforcement. Such notifications may be transmitted via a wired or wireless network, in may be formatted to provide the authority with information that could be useful in pinpointing an attacker's location. In some embodiments, the bullet-resistant curtain may also include an opening or cutout positioned on the curtain to align with a doorknob and/or lock with the bullet-resistant multilayered curtain lowered in the deployed configuration to enable an operator to lock or unlock and/or open a door. The opening or cutout may be covered by a moveable flap or removeable cover.

In the event of an emergency, an operator may grab the ribbon or lanyard and manually pull the quick release pin or pins out of the mounting casing, thereby releasing the bullet-resistant curtain to slide out of the casing and down to the bottom of the entranceway. Once the bullet-resistant curtain is straightened, the operator may lock the ends of each of the horizontal bars into respective bar retainer clamps by rotating each clamp cover until a security stud on the bar retainer clamp is locked into place. The operator may also press or throw the vibration sensor control switch to power on the vibration sensors on the bullet-resistant curtain. To exit through the entranceway, the operator may disengage each of the bar retainer clamps, releasing the bars, and then lift the bullet-resistant curtain.

Figure 2:
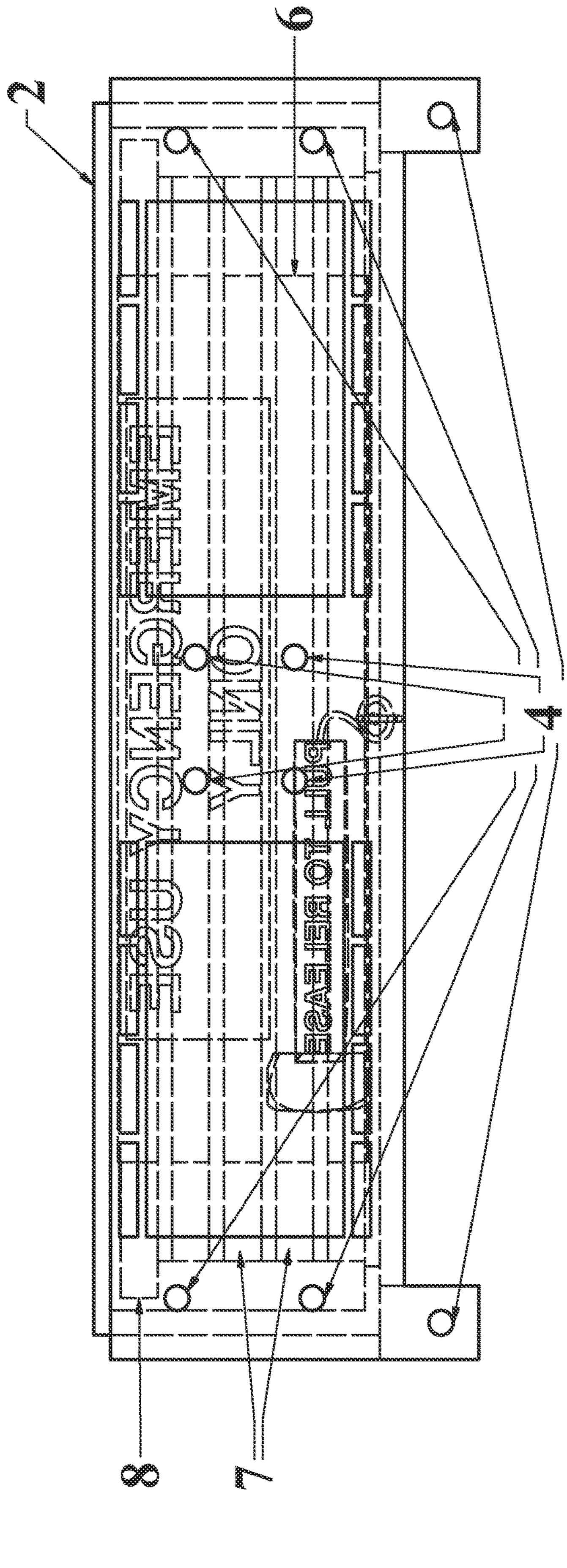
FIG. 2 is a back view of the bullet-resistant curtain security device in the stored configuration.
Figure 3:
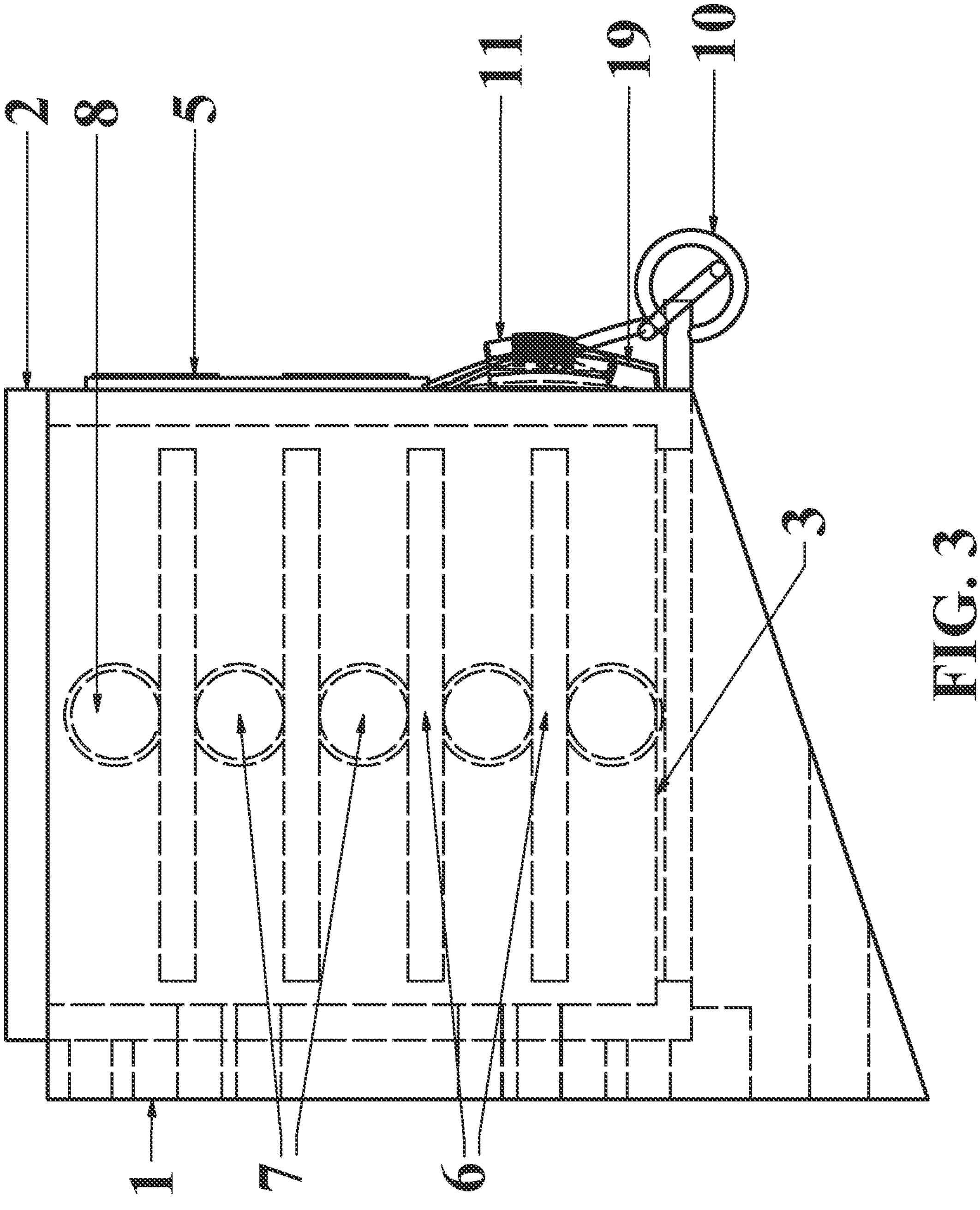
FIG. 3 is a side view of the bullet-resistant curtain security device in the stored configuration.
Figure 4:
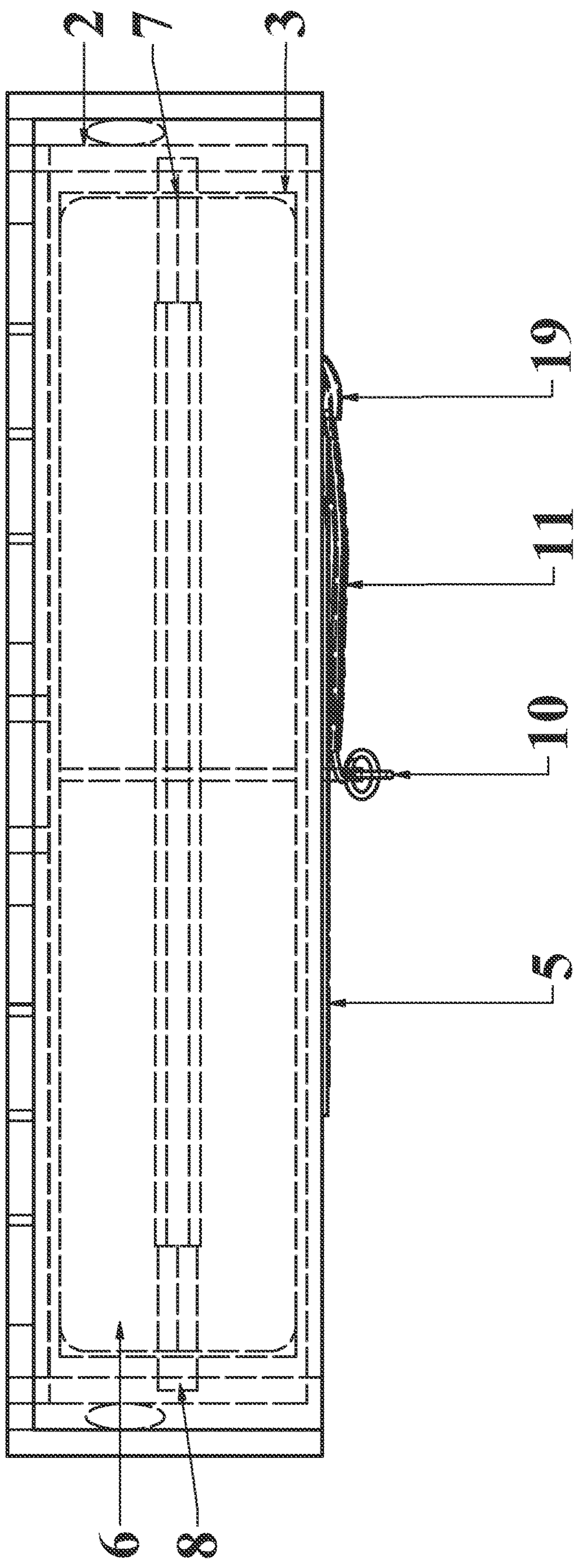
FIG. 4 is a top-down view of the bullet-resistant curtain security device in the stored configuration.
Figure 5:
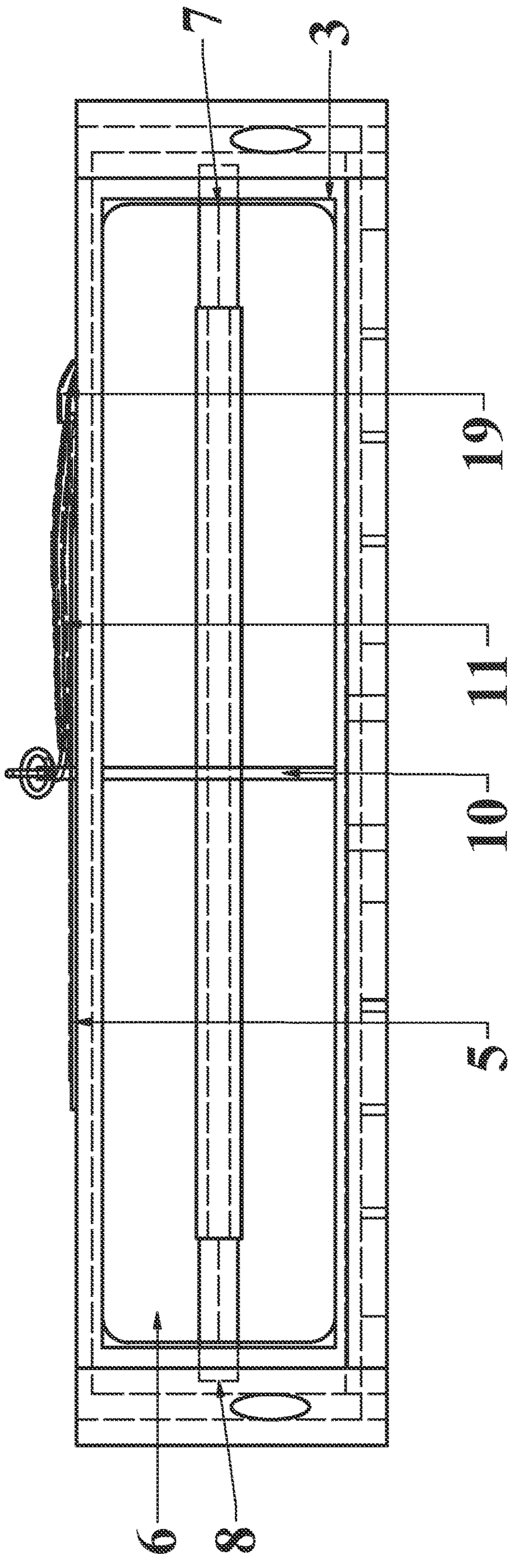
FIG. 5 is a bottom view of the bullet-resistant curtain security device in the stored configuration.
Figure 6:
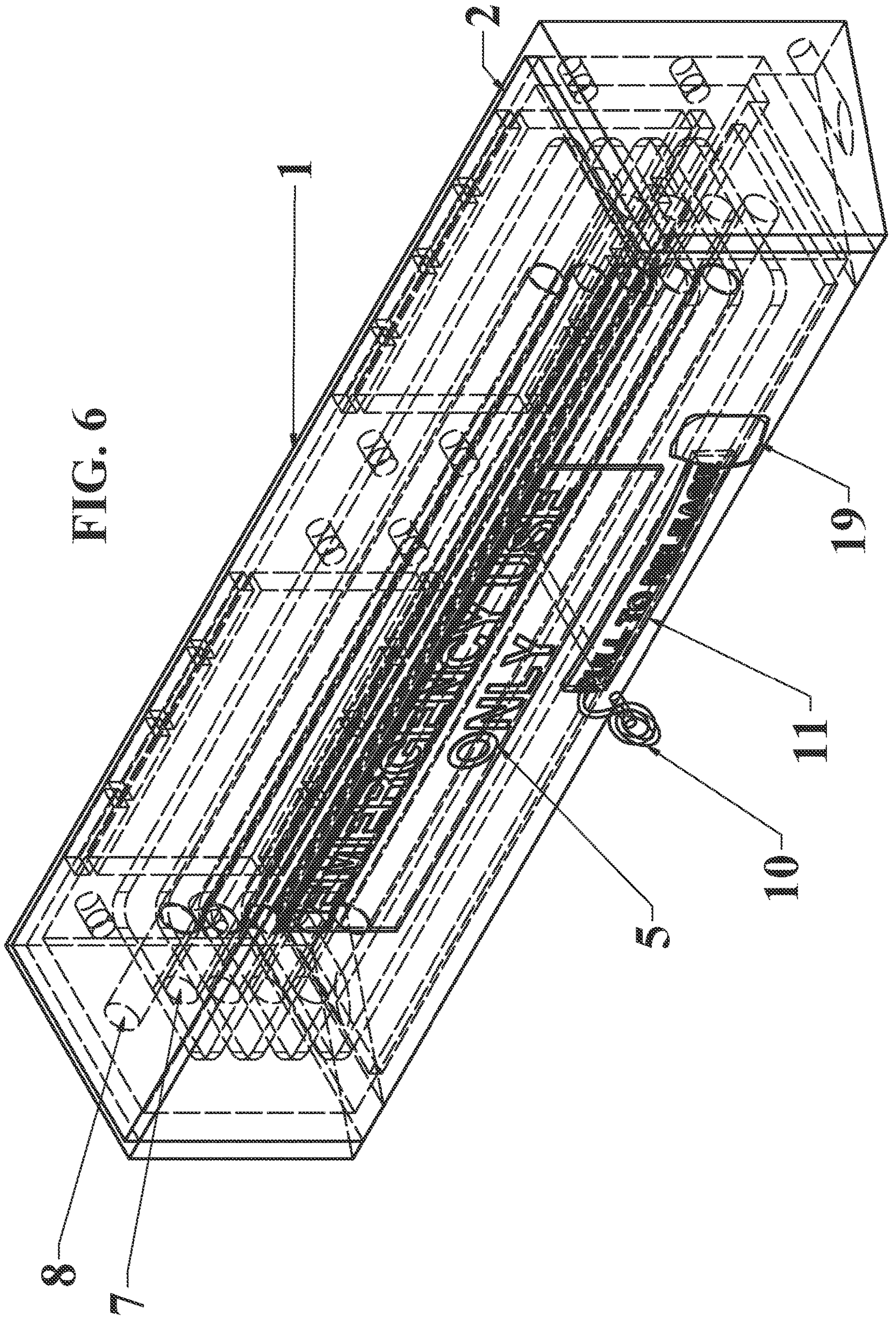
FIG. 6 is a perspective view of the bullet-resistant curtain security device in the stored configuration.

FIGS. 1-6 illustrate various embodiments in which the bullet-resistant curtain 6 is in a stored configuration folded up in a casing 1 that can be mounted above the frame of an entranceway. In FIGS. 1-6, the casing 1 and associated structures are shown in solid lines, while the folded bullet resistant curtain 6 and horizontal bars 7 within the casing 1 are shown in dashed lines. While FIGS. 1-6 show the casing 1 configured as a rectangular shaped box, the casing 1 may be cylindrical, ellipsoidal, partially rectangular and partially cylindrical, or other shape, and sized sufficient to encompass the bullet-resistant multilayered curtain 6 and horizontal bars 7 in a folded configuration as illustrated in FIGS. 3 and 6. Alternatively, the bullet-resistant multilayered curtain 6 and horizontal bars 7 may be stored in the casing 1 in a rolled up configuration, such as around a rotatable spool (not shown).

The casing 1 may be made of a strong material, such as steel, with the casing sized and configured to provide a strong anchor point for the bullet resistant curtain 6 when in the deployed configuration. FIG. 1 shows a front view of the casing 1, with features on the front side shown in solid lines and structures on a backside of the casing 1 shown in dashed lines. As illustrated in FIG. 1, the casing 1 may include a sign 5 to identify the purpose of the bullet-resistant curtain 6, such as an "EMERGENCY USE ONLY" label.

As illustrated in FIG. 1, a quick release pin 10 may be positioned within the casing 1, configured and positioned so as to support the bullet-resistant curtain 6 within the casing 1 while in the bullet-resistant multilayered curtain 6 and horizontal bars 7 are in the stored configuration. For example, the quick release pin 10 may be inserted into a quick release pin hole 12 located at the bottom of the front side of the casing 1, extending into the casing 1 so that the pin retains the bullet-resistant curtain 6 within the casing 1. As a non-limiting example, the quick release pin 10 may be made of a strong material, such as steel, and have a length of approximately 4 inches and a diameter of approximately one-half inch. As a non-limiting example, the overall dimensions of the quick release pin hole 12 may have a diameter of approximately one-half inch. In some embodiments, multiple quick release pins 10 may be included, such as to provide support for a wide bullet-resistant curtain 6 for covering a large entranceway.

In some embodiments, the quick release pin 10 may be coupled to a lanyard or ribbon 11, which may include a label, such as "PULL TO RELEASE," to identify the function of the pin. The lanyard or ribbon 11 may be removably affixed to the front surface of the casing 1, such as by tape 19. The quick release pin 10 and ribbon 11 may be configured so that in the event of an emergency, an operator can quickly and easily pull on the ribbon 11 or lanyard to remove the pin 10 from the casing 1 and thereby release the bullet-resistant curtain 6 to deploy from the casing 1 by unfolding down to cover the entranceway from top to bottom.

The length of the casing 1 may be sized to extend beyond the width of the entranceway that is to be covered so that the bullet-resistant curtain 6 can be sized so that in its deployed state the curtain covers the entire entranceway. As a non-limiting example, a casing 1 that is configured to fit over a conventional doorway may have a length of 36 inches, a width of 5 inches and a height of 8 inches. As a non-limiting example, the overall dimensions of the casing emergency sign 5 may include a length of approximately 34 inches, a height of approximately 6 inches and a width of approximately inches.

FIG. 2 illustrates a backside of the casing 1 that may be firmly attached to wall structures above the entranceway. For example, FIG. 2 shows ten casing mounting holes 4 through which bolts or screws can be used to secure the casing to wall structures. As a nonlimiting example, the ten mounting holes 4 may each have a diameter of one-half inch to accommodate similar diameter bolts or screws for mounting the casing 1 on the wall above the entranceway.

FIG. 2 also shows that the casing may include a removable top 2. In some embodiments, the removable top 2 may be used to access the top of the casing 1 in order to place the bullet-resistant curtain 6 and horizontal bars 7 into the casing. The removable top 2 may also be configured to provide maintenance technicians with access for repairing or maintaining the bullet-resistant curtain 6. As a nonlimiting example, the overall dimensions of the casing removable top 2 may include a length of 36 inches, a width of 5 inches and a height of one-half inch, and may be attached to the casing 1 via screws, bolts, latches or the like. By way of an example, to service the bullet-resistant curtain 6, a person may remove the casing removable top 2, and remove or unfold the curtain, such as to check or replace batteries in the impact sensors 20 and otherwise inspect the curtain. Such service may involve inspecting elements, such as the removeable pin 10. After servicing and/or inspection, the bullet-resistant curtain 6 and horizontal bars 7 may be refolded or re-rolled in the casing, and the casing removable top 2 put back onto the casing 1. In some embodiments, the bullet-resistant curtain 6 and horizontal bars 7 may be returned to the casing 1 after deployment (e.g., for drills or periodic testing) by removing the casing removable top 2, pulling the curtain up and out of the casing 1, and then refolding or re-rolling the curtain into the casing before replacing the top.

FIGS. 3, 4 and 5 show an end view, a top view and a bottom view, respectively, of the casing 1 showing the various components and illustrating a manner in which the bullet-resistant coating 6 and horizontal bars 7 can be stored within the casing 1 in a folded configuration. For example, the bullet-resistant curtain 6 may be folded onto the horizontal bars 7 in the casing 1. However, the bullet-resistant curtain 6 may be packed into the casing 1 in other ways, such as rolling the bullet-resistant curtain 6 around the horizontal bars 7, laying the bullet-resistant curtain 6 on top of spring-loaded horizontal bars 7, rolling the bullet-resistant curtain 6 around a spindle (not shown), etc.

FIG. 5, illustrating a bottom view of the casing 1, shows that the casing 1 may include a centered rectangular cutout 3 that may be located at the bottom of the casing 1 through which the bullet-resistant curtain 6 will deploy when the quick release pin 10 is removed. The rectangular cutout 3 may be sized to permit the bullet-resistant curtain 6 and the horizontal bars 7 to fall from the casing 1 when deployed. As a nonlimiting example, the overall dimensions of the casing centered rectangular cutout 3 may include a length of 34 inches and a width of 4 inches.

FIG. 5 also illustrates that a top of the bullet-resistant curtain 6 may be sewn or otherwise attached to an extended horizontal bar 8. The extended horizontal bar 8 may have a length greater than the other horizontal bars 7 and long enough so that it will not fit through the rectangular cutout 3. The extended horizontal bar 8 also may be welded inside the casing 1 to hold the top of the bullet-resistant curtain within the casing when in the deployed configuration. However, the extended horizontal bar 8 may be joined to or otherwise retained in the casing 1 by any known method, such as fasteners, clamps, adhesives, etc. In this way, the extended horizontal bar 8 may retain a top portion of the bullet-resistant curtain 6 within the casing 1 when deployed.

The casing 1 may have a nondescript aesthetic. The purpose of this aesthetic may be to avoid drawing attention to the protection device when not in use.

FIG. 6 provides a perspective view of the casing 1 showing all of the components described so far with interior structures and features shown in dashed lines. However, the configuration and dimensions illustrated in FIGS. 1-6 are merely of one possible embodiment and are not intended to be limiting, because the casing 1, rectangular cutout 3, casing holes 4, casing emergency sign 5, quick release pin 10 and other structures can vary in size and configuration as appropriate to accommodate the size of the entranceway to be protected. Further, the various components may be sized and configured differently than shown in the figures while performing the structural functions described herein. Further, the example materials mentioned for the various components are not intended to be limiting unless recited in a claim, and other materials and material combinations may be used provided the materials have sufficient strength and bullet resistance to withstand an attacker's force from weapons and/or bodyweight and maintain the bullet-resistant curtain 6 in its deployed state.

Figure 7:
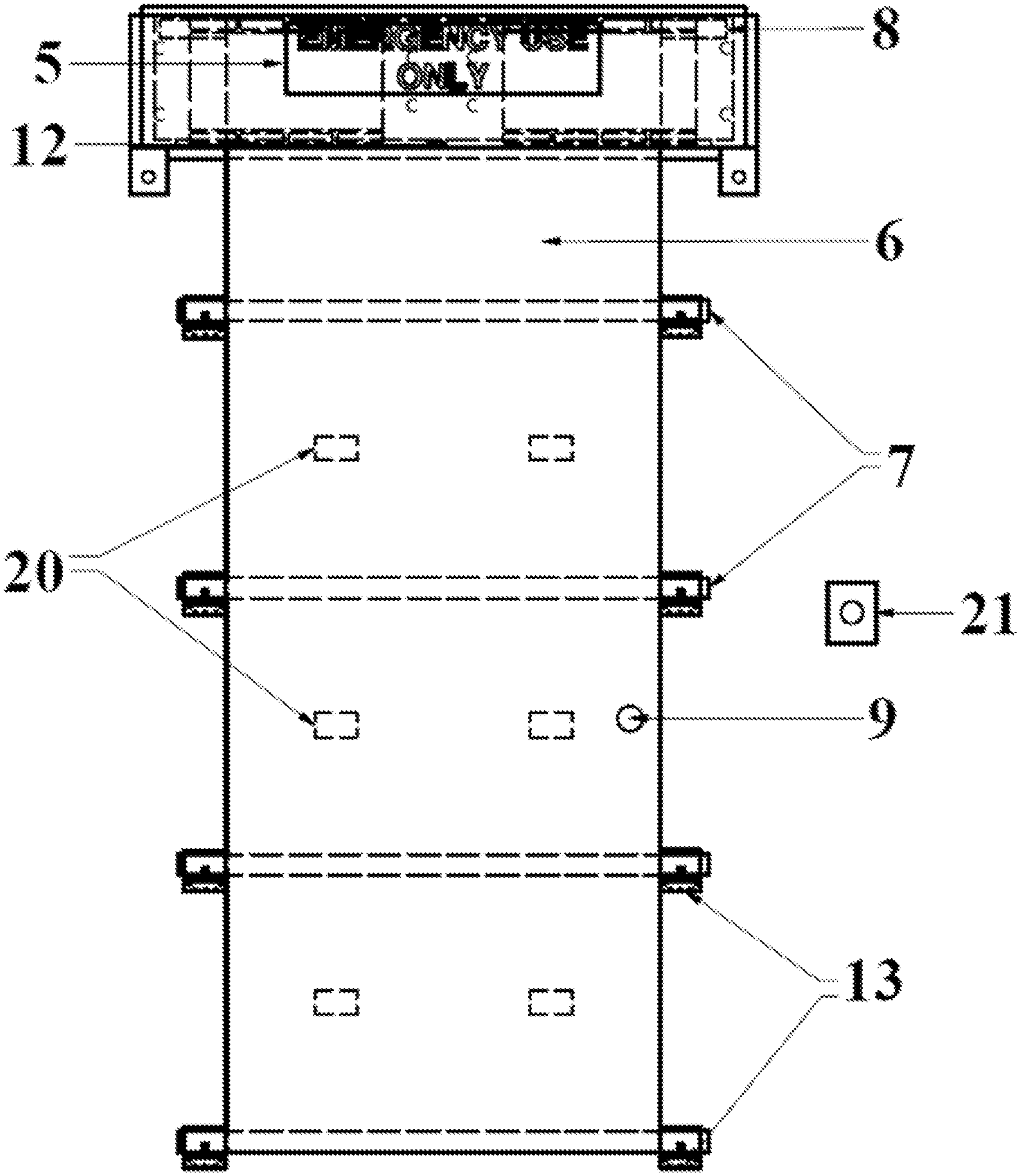
FIG. 7 is a front view of the bullet-resistant curtain security device fully extended.
Figure 8:
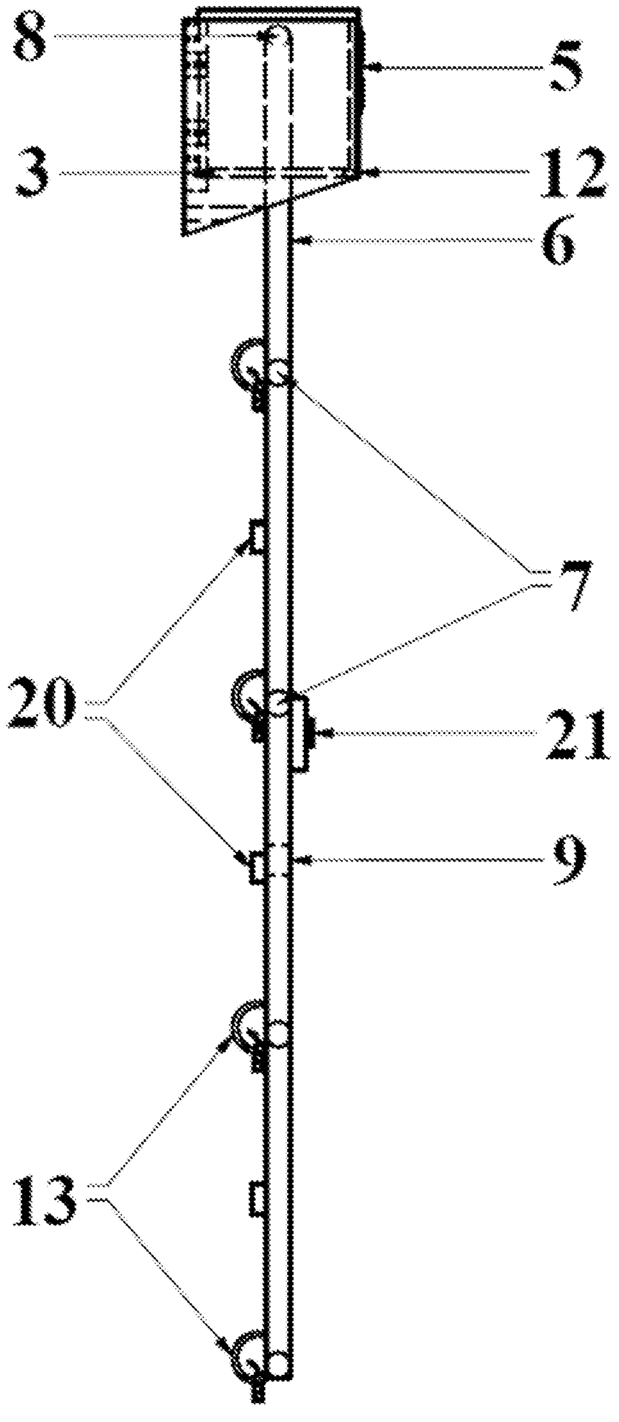
FIG. 8 is a side view of the bullet-resistant curtain security device fully extended.
Figure 9:
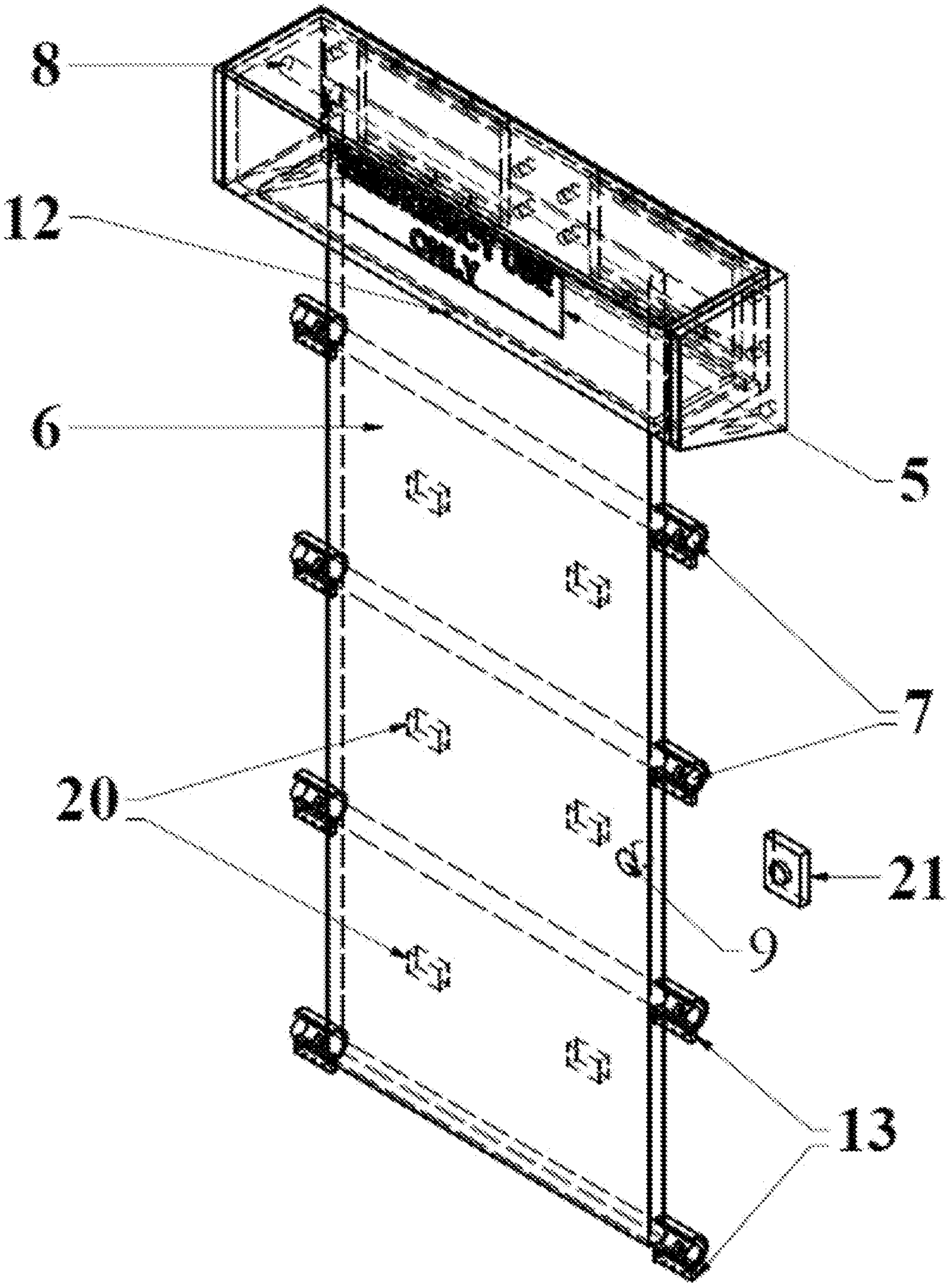
FIG. 9 is a perspective view of the bullet-resistant curtain security device fully extended.

FIGS. 7, 8 and 9 show front, side and perspective views of the protection device with the bullet-resistant curtain 6 fully extended.

As illustrated in FIG. 7, the bullet-resistant curtain 6 may include multiple layers, which may be formed in multiple overlapping panels sewn or otherwise connected together. The bullet-resistant material may be but is not limited to various types of Kevlar, Kevlar-based, and/or Kevlar-like materials, etc. The panels of bullet-resistant material may include any number of layers, and may be assembled using any layer joining methods such as adhesives, fasteners, etc. and bullet resistant grade. Further, panels of multiple layers of bullet-resistant material may at least partially overlap at seams to avoid weak points. In a nonlimiting example, the bullet-resistant curtain may be made from 10-25 layers of Kevlar 29 (K29) that are sewn together in panels that connect together in a manner that uniformly straightens to a height of the entranceway on which the protection device is deployed. In various embodiments, the number of layers of bullet-resistant material and the type of material used in the bullet-resistant curtain 6 may vary depending upon the nature of type and nature of threats (e.g., caliber and number of bullets to be resisted) that are anticipated and for which the protective device is deployed. For example, in applications intended for civilian buildings (e.g., schools, homes, etc.), 10-25 layers of Kevlar 29 or even fewer numbers of layers may be used in the bullet-resistant curtain 6. As another example, in applications intended for military applications, 30 or more layers of Kevlar 29 (or other materials) may be used in the bullet-resistant curtain 6 to provide protection against high caliber weapons with large magazines, fragmentation munitions, etc.

As a non-limiting example, the overall dimensions of the bullet-resistant curtain may include a height of approximately 84 inches, a width of approximately 30 inches and a thickness of approximately 3 inches. However, the bullet-resistant curtain 6 can vary in measurements based on parameters such as entranceway size, and can have any shape, such as hexagon, octagon, oval, etc., to match the shape of the protected entranceway.

A plurality of horizontal bars 7 may be coupled to and extend across the width of the bullet-resistant curtain 6 via pockets or by sandwiching the bars between layers in the curtain (as illustrated in the dashed lines) via stitching (or other mechanisms) to hold each of the horizontal bars 7 in position on the curtain so as to match up to the bar retainer clamps matter on the periphery of the entranceway. As a nonlimiting example, the overall dimension of the horizontal pockets may include a length of approximately 30 inches and with a diameter of approximately 1½ inches. However, the bullet-resistant curtain 6 can be joined to the horizontal bars 7 using other known methods, such as adhesives, fasteners, etc. The horizontal bars 7 may be sized and made of strong materials (e.g., steel, titanium, iron, nickel alloys, etc.) so as to prevent an attacker's weapon and/or bodyweight from breaking through the bullet-resistant curtain 6.

As described above, in the deployed configuration, the bullet-resistant curtain 6 may hang from an extended horizontal bar 8 that is too long to fit through the rectangular cutout 3 in the casing 1. Also when deployed, each end of each of the horizontal bars 7 may be latched into bar retainer clamps 13 that are mounted on the periphery of the entranceway, such as via bolts or screws.

The horizontal bars 7 may be distributed along the length of the bullet-resistant curtain 6 and be connected to or sandwiched between the coplanar bullet-resistant layers at locations that provide sufficient reinforcement to prevent an attacker from being able to penetrate the deployed curtain. As a nonlimiting example, the horizontal bars 7 and the sewn horizontal pockets may be positioned approximately 16.8 inches apart along the length of the bullet resistant curtain 6. Alternatively or additionally, the horizontal bars 7 may be positioned on the bullet-resistant curtain 6 at locations that will support the weakest points of the entranceway when in the deployed state. In some alternative configurations, the horizontal bars 7 may be positioned in the front or back of the bullet-resistant curtain 6 and in any width or length of distribution along the bullet-resistant curtain 6.

The horizontal bars 7 fit into the covers 14 of the wall-mounted horizontal bar retainer clamps 13. The horizontal bars 7 may be configured in any suitable size and shape to fit into the covers 14 of the wall horizontal bar retainer clamps 13 provided the bars in the clamps perform the intended function of locking into the bar retainer clamps 13 and providing sufficient lateral support to the bullet-resistant curtain 6 across the entire entranceway to withstand an attacker's force from weapon and/or bodyweight. In embodiments in which the ends of the horizontal bars 7 are cylindrical in shape, the covers 14 of the wall horizontal bar retainer clamps 13 may be semi-cylindrical to match the contour of the bar ends, as illustrated in more detail in FIGS. 11-15.

As a nonlimiting example, the horizontal bars 7 may be round in cross-section, solid, made of grade 5 titanium, and long enough to extend beyond the width of the entranceway where the ends can be clamped and thus retained by the bar retainer clamps 13. As a nonlimiting example, the horizontal bars 7 may be of equal length of approximately 34 inches, and with a diameter of approximately 1½ inches, with the extended horizontal bar 8 having a length of approximately 36 inches, and with a diameter of approximately 1½ inches. In some embodiments, the extended horizontal bar 8 that remains in the casing 1 in the deployed configuration may be welded approximately 1 inch down from the top of the casing 1. However, the extended horizontal bar 8, the horizontal bars 7, and sewn horizontal pockets can vary in measurements based on parameters such as entranceway size and can be of various shapes, such as square, etc.

FIG. 7 also illustrates that in some embodiments, one or more vibration sensors 20 may be fixed within or on an interior surface of the bullet-resistant multilayered curtain 6, such as glued or sewn to the outside layer of the curtain facing the interior of the room or building that is being protected. Any of a variety of vibration sensors 20 may be used, such as accelerometers, with the sensors configured to detect impacts from bullets, shrapnel, wood or metals from the entranceway frame, and other projectiles, as well as fists, hammers, clubs, battering rams, and the striking the curtain. The vibration sensors 20 may be coupled to the bullet-resistant multilayered curtain 6 via various attachment methods, such as sandwiched between the coplanar bullet-resistant layers, affixed on the outside layer of the curtain opposite of the entranceway via fasteners, adhesives, sewing, etc. In some embodiments, the vibration sensors 20 may be battery powered, such as by coin batteries. While FIG. 7 illustrates six vibration sensors 20 positioned in a regular pattern on the bullet-resistant curtain 6, the one or more vibration sensors 20 may be positioned anywhere on the curtain, one or more horizontal bars 7, one or more and/or on the casing 1. Further, any number of vibration sensors 20 may be included, including fewer and more than the six sensors shown in FIG. 7.

The vibration sensors 20 may be configured to detect vibrations and motions of the bullet-resistant multilayered curtain 6 resulting from penetrative objects, such as a bullet from the attacker's weapon and/or bodyweight. The vibration sensors 20 may include or be connected to a wireless or wired transceiver configured to transmit notifications or impact detection information to a monitoring device or station, such as to security personnel and/or law enforcement. A wireless transmitter with a transmission range of 100 meters transmitting at a frequency band of 2.4 gigahertz (GHz). Notifying the authority about sensed impacts or large vibrations on the bullet-resistant multilayered curtain 6 may provide information that could be used to pinpoint an attacker's location.

In some embodiments, the one or more vibration sensors 20 may include one or more indicator lights (not shown), such as low-power light emitting diode (LED) lights to indicate whether the sensor(s) are activated. For example, the one or more vibration sensors 20 may include a red LED that is illuminated when the bullet-resistant curtain 6 is deployed but the sensor(s) is/are off, and a green (blue, yellow or other color) LED is illuminated when the bullet-resistant curtain 6 is deployed and the sensor(s) is/are activated.

The vibration sensors 20 may be in a power-off state when the bullet-resistant multilayered curtain 6 is in the stored configuration within the casing 1. In some embodiments, a vibration sensor control switch 21 configured to control power to the vibration sensors 20 may be fixed on the perimeter of the entranceway. The vibration sensors 20 may be in a power-off state on the bullet-resistant multilayered curtain 6 until activated by the vibration sensor control switch 21. As a nonlimiting example, the overall dimensions of the vibration sensors 20 and the vibration sensor control switch 21 may include a width of approximately 4 inches and a thickness of approximately one-half inch, have a battery life of 2 years. In some embodiments, the vibration sensors 20 and the vibration sensor control switch 21 may have a startup and shutdown time of 15 seconds.

The vibration sensors 20 and vibration sensor control switch 21 can vary in size and configuration based on parameters such the entranceway size and can be of any shape such as oval, rectangle, etc.

FIG. 7 also illustrates that in some embodiments, the bullet-resistant multilayered curtain 6 may include an opening 9 that is positioned on the curtain to align with a doorknob and/or door lock. In some embodiments, the opening may be covered by a bullet resistant cover or flap or a removable bullet resistant cover that can be moved (e.g., folded, raised or removed) to provide access to the doorknob and/or door lock. Including such an opening 9 may enable an operator inside the room to lock the door on deployment and unlock and/or open the door after a threat is no longer present.

FIGS. 8 and 9 show side and perspective views of the bullet-resistant curtain 6 showing the elements described with reference to FIG. 7. FIGS. 8 and 9 show the deployed bullet-resistant curtain 6 after it has dropped from the casing 1 but before the horizontal bars 7 have been latched into the bar retainer clamps 13. This is an example of how the curtain may appear when first released from the casing 1 and before the horizontal bars 7 have been latched into the bar retainer clamps 13.

Figure 10:
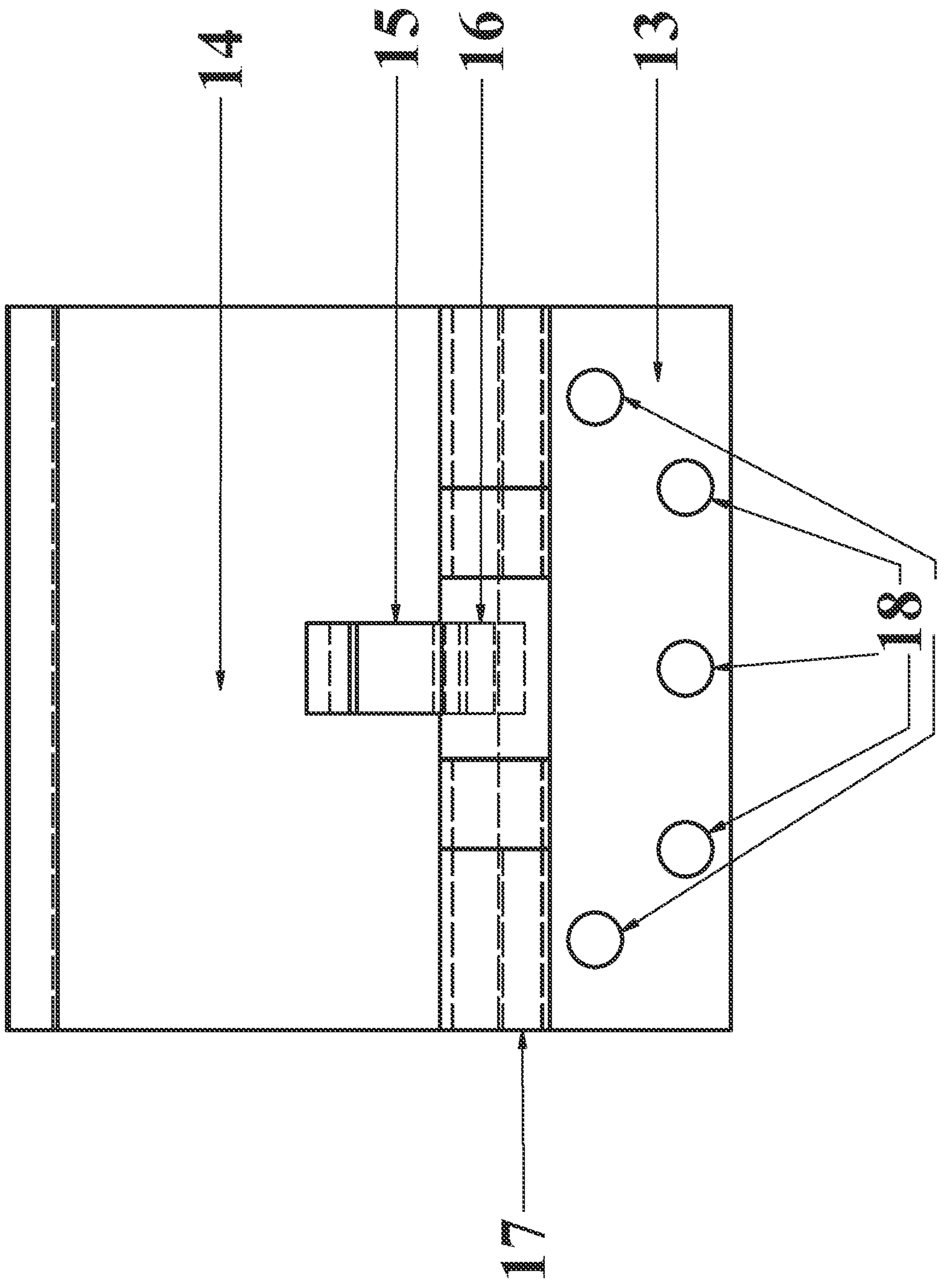
FIG. 10 is a front view of a bar retainer clamp device.
Figure 11:
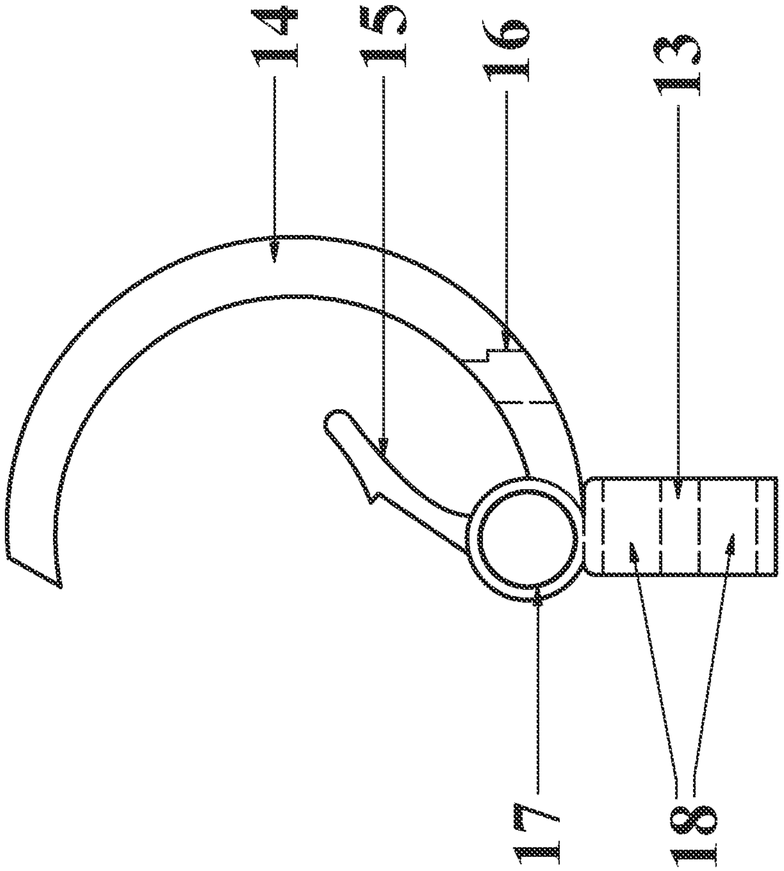
FIG. 11 is a side view of a bar retainer clamp device.

FIGS. 10 and 11 show details of the bar retainer clamps 13. Each horizontal bar retainer clamp 13 may include a cover 14 that pivots on a hinge pin 17 in one or more knuckle joints, and a security stud 15 that functions to lock the cover in an engaged configuration. The horizontal bar retainer clamps 13 may each have a semi-cylindrical cover 14 in configurations in which the ends of the horizontal bars 7 are cylindrical. In some embodiments, the horizontal bar retainer clamps 13 may include three knuckle hinges as illustrated. The knuckle hinges and hinge pin 17 enable an operator to rotate the semi-cylindrical cover 14 over an end of a horizontal bar 7 to secure the entranceway. As a non-limiting example, the semi-circular covers 14 may have a length of 3½ inches, an inside diameter of 1½ inches and a thickness of ⅛ inch, and the hinge pin 17 may have a length of 3½ inches and a diameter of 0.234 inch. However, the horizontal bar retainer clamps 13, semi-cylindrical cover 14, and hinge pin 17, can vary in measurement based on parameters such as entranceway size. Further the clamp cover shape may have any shape as appropriate for engaging an end of a horizontal bar 7, such as concave, rectangle, triangular, etc. Further, the number of bar retainer clamps 13, number of knuckles and methods for securing the deployed horizontal bars 7 may vary based on configurations and the dimensions of the entranceway to be protected. Further, in some embodiments, instead of rotating the cover 14 up onto the horizontal bars 7, the horizontal bars could be sized so that they can be slid into the bar retainer clamp 13, or the bar retainer clamp can be slid over the horizontal bars 7, etc.

The horizontal bar retainer clamps 13 each have a centered security stud 15, which may be made of a flexible material, such as rubber, plastic or flexible polymer. When the semi-cylindrical cover 14 is rotated the security stud 15 and the stud hole 16 lock the horizontal bars 7. At any time, the security stud 15 when operated can unlock the semi-cylindrical cover 14. In this way the operator is able to release the bullet-resistant 6 curtain quickly and efficiently, position each end of the horizontal bars 7 in their respective horizontal bar retainer clamps 13 and rotate the semi-cylindrical covers 14 down over each end of the horizontal bars 7 until the security stud 15 is locked into place. As a non-limiting example, the centered security stud 15 may have a height of approximately 1 inch and a width of approximately one-half inch. The security stud 15 may include a one-quarter inch edge configured to lock into a security stud hole 16 in the cover 14. As a non-limiting example, the semi-cylindrical cover 14 may include a centered stud hole 16 with a height of approximately one-eighth inch and a width of approximately one-half inch. The stud hole 16 may include an approximately one-quarter inch edge to lock the security stud 15. However, the security stud 15, and security stud hole 16 can vary in measurement based on parameters such as entranceway size, and can be composed of any shape, size, material such as and not limited to various types of rubber-like material, state such as hollow, etc., and number of locking studs, or stud holes.

Figure 12:
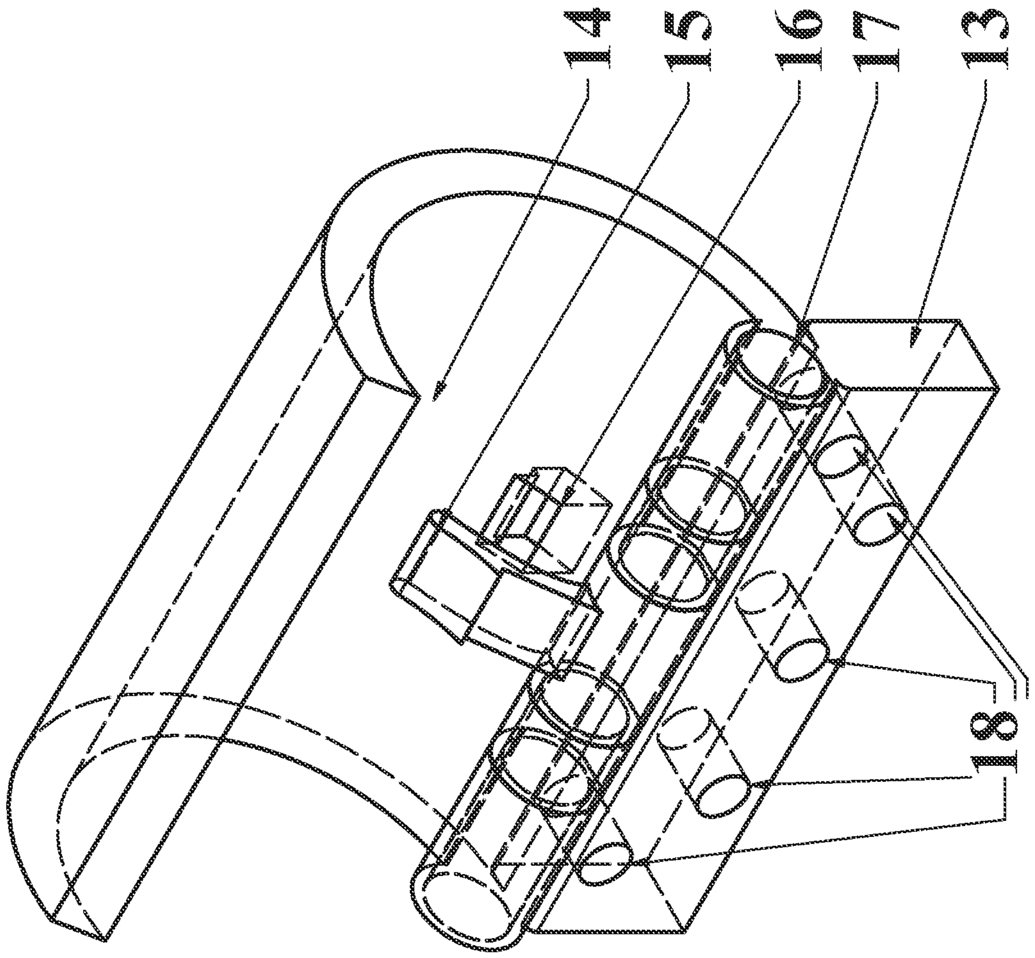
FIG. 12 is a perspective view of a bar retainer clamp device.
Figure 13:
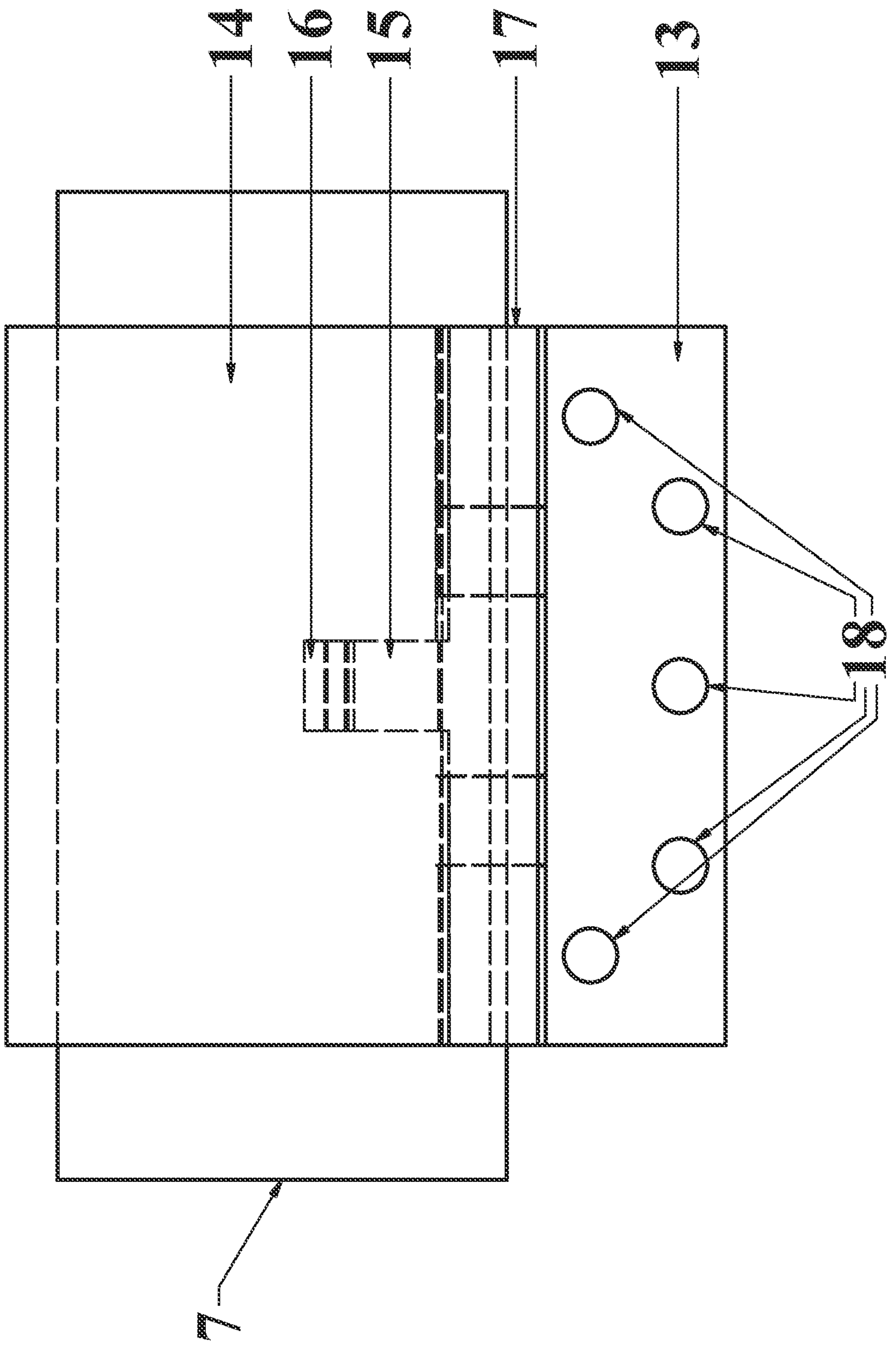
FIG. 13 is a front view of a bar retainer clamp device closed around a horizontal bar in the deployed configuration.
Figure 14:
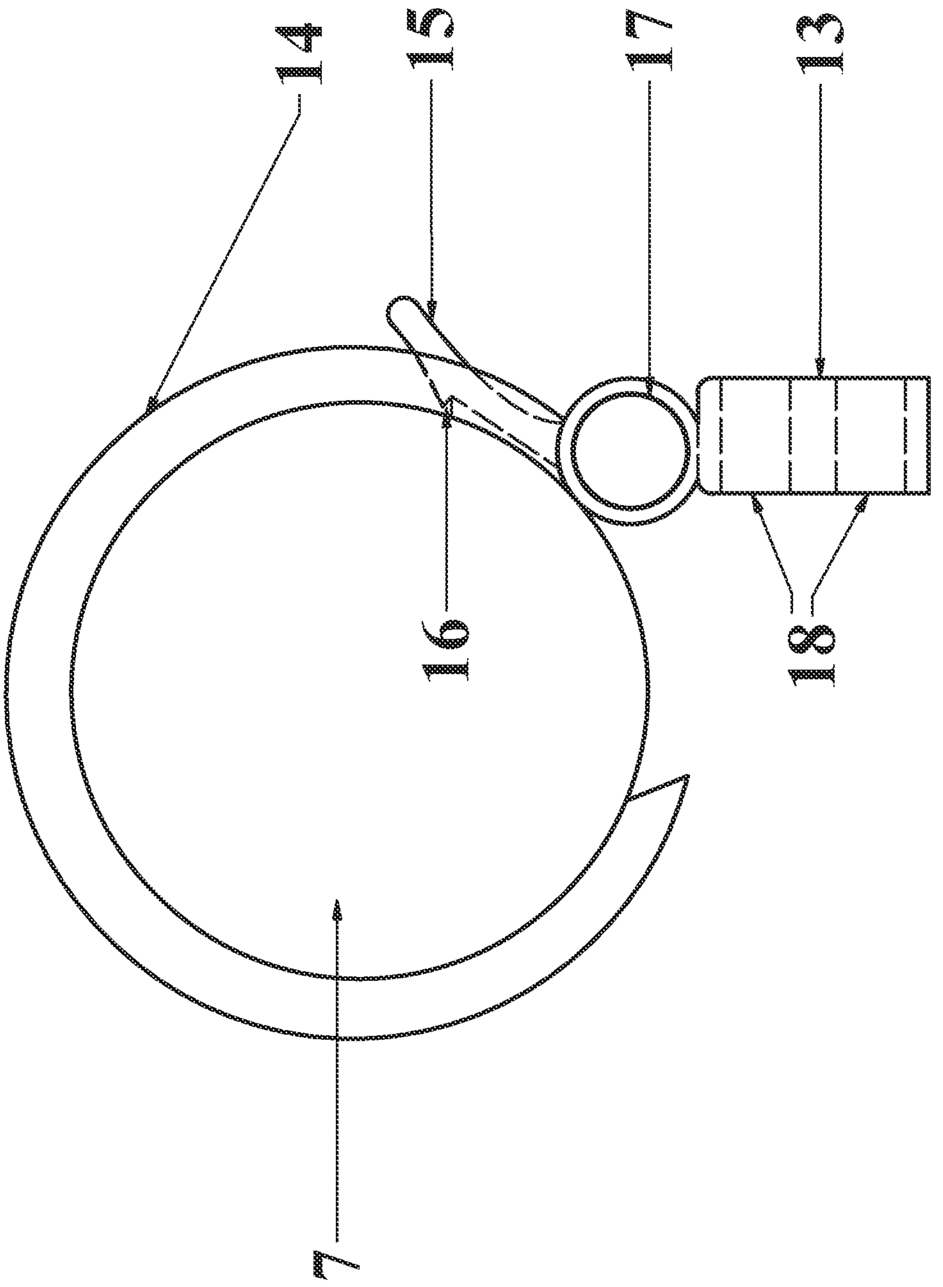
FIG. 14 is a side view of a bar retainer clamp device closed around a horizontal bar in the deployed configuration.
Figure 15:
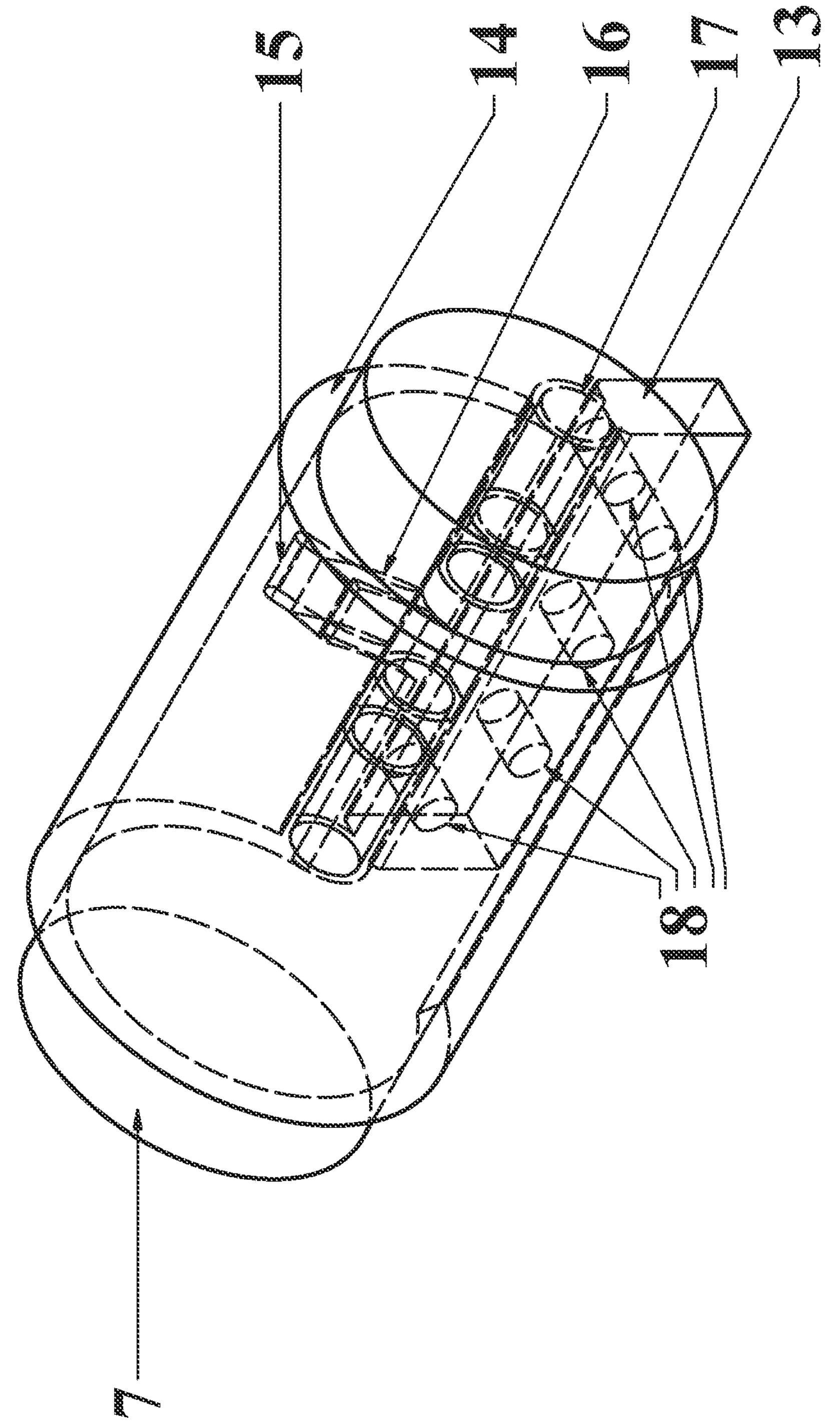
FIG. 15 is a perspective view of a bar retainer clamp device closed around a horizontal bar in the deployed configuration.

Referring to FIGS. 11-13, when installed, individual bar retainer clamps 13 are firmly fixed on the perimeter of the entranceway positioned along the vertical edge so that the bar retainer clamps match up with and thus can engage each end of a respective one of the horizontal bars 7 so as to lock the bars into place when the bullet-resistant curtain 6 is in its deployed state. In some embodiments, the horizontal bar retainer clamps 13 may be made of solid steel and have a length of approximately 3½ inches, a leaf width of approximately 1½ inch, and a thickness of approximately 0.086 inches. In some embodiments, the bar retainer clamps 13 may have five holes 18 with a diameter of 35 mm for mounting to the perimeter of the entranceway. However, the bar retainer clamps 13 and bar retainer clamp holes 18 can vary in dimensions depending on parameters such as entranceway size, and can be of any shape, size, and number of mounting holes. Further, the bar retainer clamps 13 may be hollow, and may be made from materials other than or in addition to steel, such as but not limited to various types of metal-like materials of a bullet resistant grade sufficient to withstand an attacker's force from weapon and/or body-weight applied to a horizontal bar 7.

When mounted on the entranceway, the bar retainer clamps 13 may be positioned at any distance on the perimeter such that the bar retainer clamps function to lock each end of the horizontal bars 7 in place when the bullet-resistant curtain 6 is in its deployed state.

Figure 16:
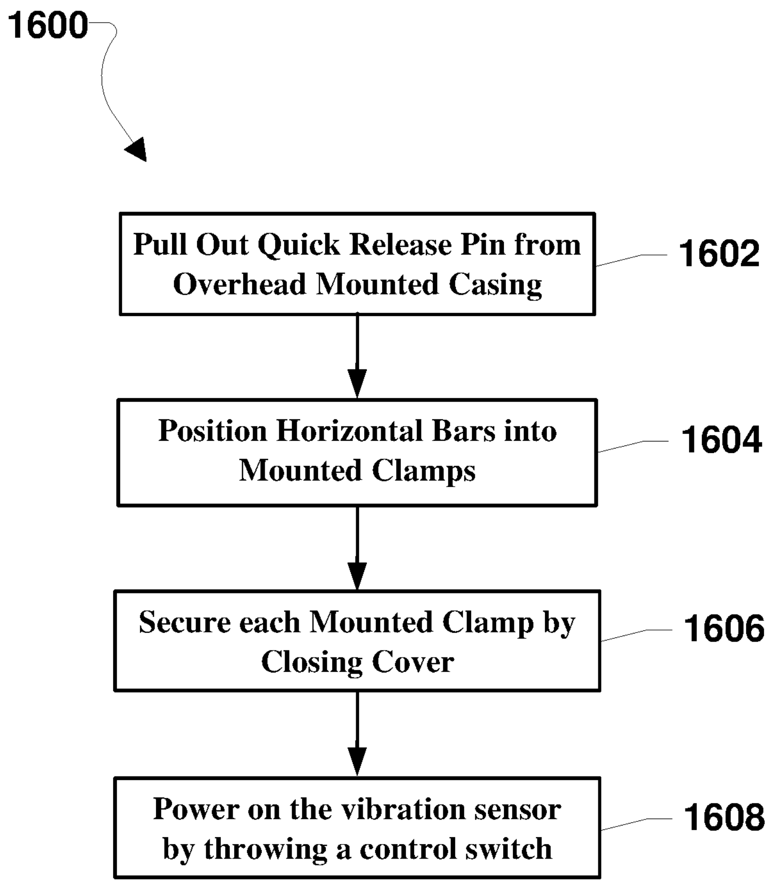
FIG. 16 is a process flow diagram outlining steps involved in deploying the bullet-resistant curtain security device in accordance with some embodiments.

Referring to FIG. 16, various embodiments can be operated in case of an emergency by the following procedure 1600. In block 1602, an operator approaching the entranceway will reach for the lanyard or ribbon 11 coupled to the quick release pin 10 in the overhead casing 1 and pull on it to pull the quick release pin 10 out of the casing, which releases the bullet-resistant curtain 6 in the casing 1, allowing the curtain to unfold and extend down to the bottom of the entranceway. In block 1604, once the bullet-resistant curtain 6 is completely straightened, the operator will position each end of the horizontal bars 7 into their respective bar retainer clamps 13. In block 1606, to secure the horizontal bars 7 in the bar retainer clamps 13, the operator will rotate each clamp cover 14 over each end of the horizontal bars 7 until the security stud 15 is locked into place. In block 1608, the operator will throw, press or otherwise actuate the vibration sensor control switch 21 to power on the vibration sensors 20 on the bullet-resistant curtain 6. At this point, the bullet-resistant curtain 6 provides a bullet resistant barrier covering the entire opening of the entranceway, with strong horizontal bars 7 locked into place by the clamps 13 mounted on the frame providing a barrier to forced entry.

Various embodiments provide an economically efficient structure for quickly securing an entranceway. Various embodiments may vary in dimensions, materials, configurations, and aesthetics depending upon the entranceway to be protected, the nature of the threat, and the nature of the building use. Once deployed, the protection device provides an effective and inexpensive physical security barrier in the entranceway that not only protects individuals from being wounded by bullets or shrapnel but also keeps attackers at bay.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

I claim:

1. A protection device for securing an entranceway, comprising:

a bullet-resistant curtain made of multiple layers of bullet-resistant material having a width equal to or wider than a width of the entranceway and a length sufficient so that the bullet-resistant curtain covers a height of the entranceway when deployed;

a plurality of horizontal bars that exceed a width of the entranceway, the plurality of horizontal bars attached to and distributed along the length of the bullet-resistant curtain; and a plurality of bar retainer clamps configured to be attached to a perimeter of the entranceway, each of the plurality of bar retainer clamps comprising:

a body comprising a mounting surface and a hinge; and a cover coupled to the hinge and configured to be rotated over one end of a horizontal bar to lock the horizontal bar in place, wherein when installed and deployed, the plurality of bar retainer clamps are positioned on the perimeter of the entranceway so that pairs of bar retainer clamps lock a respective one of the plurality of horizontal bars into place.

2. The protection device of claim 1, wherein the plurality of horizontal bars are made of titanium.

3. The protection device of claim 1, wherein the horizontal bars are positioned at locations along the length of the bullet-resistant curtain so that when deployed the horizontal bars will prevent entry or displacement of the bullet-resistant curtain.

4. The protection device of claim 1, wherein the plurality of horizontal bars are attached to the bullet-resistant curtain by sandwiching the horizontal bars between coplanar layers of the bullet-resistant material.

5. The protection device of claim 1, wherein the bullet-resistant curtain comprises a plurality of horizontal pockets sewn across a width of the bullet-resistant curtain, each horizontal pocket configured to enclose one of the plurality of horizontal bars.

6. The protection device of claim 1, wherein the horizontal bars are configured to fit into an inner radius of the covers of the plurality of bar retainer clamps.

7. The protection device of claim 1, wherein each of the plurality of horizontal bar retainer clamps further comprise a security stud, security stud hole, a hinge pin and a plurality of knuckle hinges.

8. The protection device of claim 7, wherein the security studs are composed of a flexible material.

9. The protection device of claim 1, wherein the horizontal bar retainer clamps each have a plurality of holes for mounting.

10. The protection device of claim 1, wherein the plurality of horizontal bar retainer clamps are composed of steel.

11. The protection device of claim 1, wherein the plurality of bar retainer clamps and horizontal bars are configured to secure the entranceway when installed and deployed.

12. The protection device of claim 1, further comprising a casing coupled to one end of the bullet-resistant curtain and configured to be attached to a structure above the entranceway and sized to contain the bullet-resistant curtain in a folded configuration when the protection device is not deployed.

13. The protection device of claim 12, wherein the casing includes an opening located on a bottom of the casing, wherein the opening is positioned and sized so that the bullet-resistant curtain will release vertically from the casing when the bullet-resistant curtain is deployed.

14. The protection device of claim 12, wherein the casing comprises a plurality of holes for mounting the casing above the entranceway.

15. The protection device of claim 12, wherein the casing has a length that will exceed the width of the entranceway when the protection device is mounted above the entranceway.

16. The protection device of claim 12, further comprising a quick release pin, wherein the casing includes a hole sized to accept the quick release pin and positioned near a bottom of a front side of the casing and a support structure on a back side of the casing configured to support the quick release pin when inserted into the casing, and wherein the quick release pin and casing are configured such that the quick release pin maintains the bullet-resistant curtain in a folded configuration within the casing when the protection device is not deployed and releases the bullet-resistant curtain to deploy when the quick release pin is withdrawn from the casing.

17. The protection device of claim 16, wherein the quick release pin is coupled to a ribbon with a safety warning label.

18. The protection device of claim 1, further compromising comprising a plurality of vibration sensors configured to detect impacts from penetrative objects and transmit notifications of detected impacts to an authority.

19. The protection device of claim 18, further comprising a vibration sensor control switch coupled to the plurality of vibration sensors via a wired or wireless connection and configured to activate the vibration sensors when the switch is touched by an operator.

* * * * *